3,389,255
INTENSIFYING SCREENS
Tatsuji Takizawa, Keiji Shimiya, and Akio Kaji, Kanagawa-ken, Japan, assignors to Dai Nippon Toryo Kabushiki Kaisha, Osaka-shi, Japan, a corporation of Japan
Filed Mar. 4, 1964, Ser. No. 349,501
8 Claims. (Cl. 250—80)

This invention relates to an improvement of an intensifying screen for radiography. Fluorescent intensifying screens or metal foil screens have been used in radiography. Fluorescent intensifying screens are used generally in combination with photographic films of screen type (for example, Fuji #400 manufactured by Fuji Photo Film Co., Ltd., Japan; Sakura S manufactured by Konishiroku Photo Ind. Co., Ltd., Japan; Kodak F etc.) and have the advantage that the photographic time and the exposure dose of radiation can be reduced remarkably. On the contrary, they are apt to be affected by scattered radiation and thereby adversely affect the image and reduce the accuracy of examination and particularly when X-rays of high energy above 100 kvp. or gamma ray is used. On the other hand, when a metal foil of suitable material and of thickness is selected as a metal foil screen and is used in combination with a film of no-screen type (e.g., Fuji #200 and #100 manufactured by Fuji Photo Film Co., Ltd., Japan; Sakura RR and R manufactured by Konishiroku Photo Ind. Co., Ltd., Japan; Kodak AA, Kodak A, etc.), a photograph of good image can be obtained for radiation of high energy. However, since a long time period is required for photographing and a large quantity of exposure dose is consumed, the efficiency of examination is lowered and the health hazard from radiation is increased.

An object of this invention is to provide an intensifying screen in which the lowering of the image quality caused by scattered radiation is minimized while the feature of the high speed of the previous fluorescent intensifying screen is preserved. The intensifying screen according to this invention is described with reference to the appended drawings, wherein.

The screen is comprised of a layer 1 of fluorescent material which is identical to that of known fluorescent intensifying screens. The layer is ordinarily constructed to a thickness of 0.01–0.5 mm. of a fluorescent material which emits light at high efficiency by means of radiation, such as calcium tungstate, barium sulfate activated with lead, zinc sulfide activated with silver, potassium iodide activated with thallium, and the like, with a binder which comprises a suitable organic high polymer, for example, cellulose nitrate, ethylcellulose, cellulose acetate, polyvinyl acetate, polystyrene, polyvinyl butyral, polymethyl methacrylate and the like, and the proportion of high polymer to fluorescent material in this case is generally within the range of 4–20% by weight. The surface of the fluorescent material layer is also, in many cases, protected against moisture and mechanical damage by coating it with an organic high polymer of 0.005–0.05 m./m. in thickness, for example, with a thin film of cellulose nitrate, cellulose acetate, polymethyl methacrylate and the like.

Figure 1:
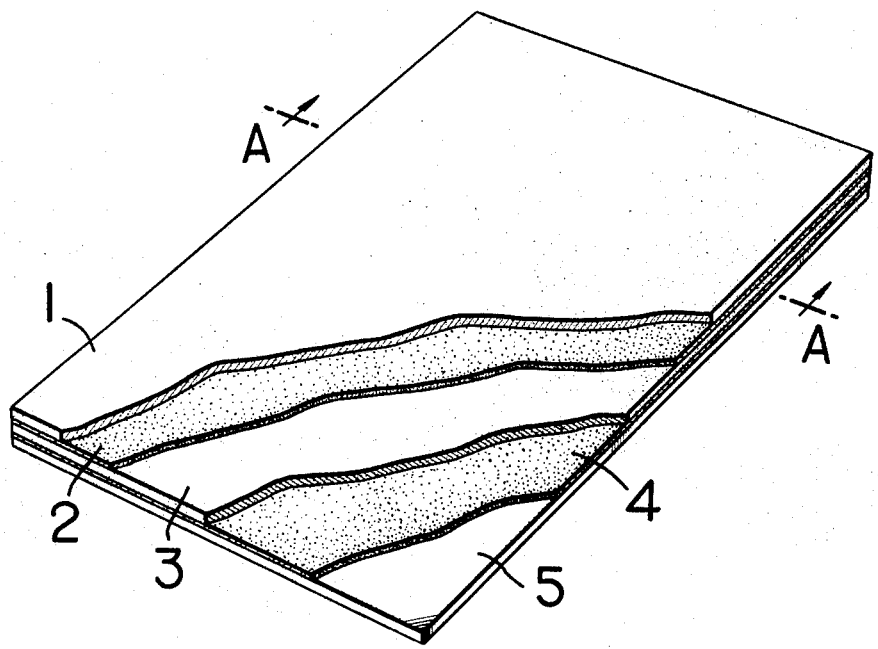
FIGURE 1 is a perspective view of an intensifying screen partially cut away.
Figure 2:
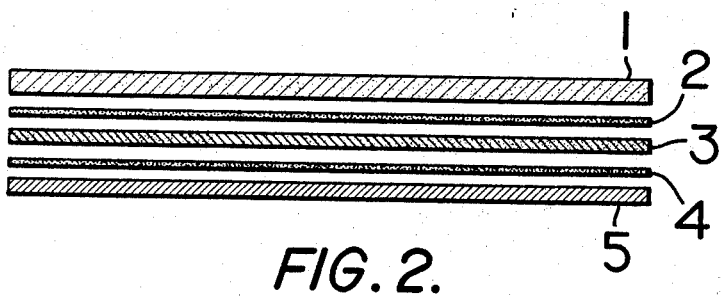
FIGURE 2 is a vertical section taken along line A—A in FIG. 1, the elements being shown separated.

The supporting layer 5 in FIG. 1 and FIG. 2 is the same supporting layer as employed in previous fluorescent intensifying screen and it is generally composed of paper, cloth or plastic sheet of 0.01–0.75 m./m. in thickness, which absorb little radiation. In the known fluorescent intensifying screens, a supporting layer, which is treated with white pigment of good reflection to fluorescence or with coloring matter which absorbs fluorescence, is often used, while such treatment is not always required in the intensifying screen according to this invention.

The intensifying screen according to the present invention, is characterized by interposing a metal foil 3 between the fluorescent material layer 1 and the supporting layer 5 as described above by means of adhesive material layers 2 and 4. The metal foil 3, on the one hand, prevents deterioration of the image by direct radiation, depending on the emission of the fluorescent material layer 1 by scattered radiation, by eliminating the scattered radiation from the supporting layer 5, and on the other hand, the sharpness of the image by direct radiation is improved by the fact that the metal foil 3 absorbs the emission of the fluorescent material layer 1, which goes backwards, in the manner of an absorption layer of known fluorescent intensifying screens; both effects are contemplated to improve the image property of radiography. For this purpose, pure lead or lead alloy, which has more absorption of the outer scattered radiation, little of its own generation of scattered radiation, and a comparatively lower reflection ratio to fluorescence, is especially effective, compared with other metals, such as iron, copper, tin and the like. The thickness of the metal foil 3 is suitably within the range of 0.01–0.5 m./m. lead equivalent, corresponding to the quality of radiation used, so that as little direct radiation is absorbed as possible and the scattered radiation is eliminated as completely as possible. For example, when X-rays of high voltage above 100 kvp. are used, the suitable range of lead equivalent is 0.01–0.03 m./m. for the human body, 0.03–0.1 m./m. for photographing a steel plate of a thickness less than 50 m./m. or a material having an X-ray absorption equivalent thereto, 0.1–0.3 m./m. for photographing a steel plate of a thickness greater than 50 m./m. or a material having an X-ray absorption equivalent thereto, and 0.3–0.5 m./m. for photographing a metal product of great difference in thickness and of complicated form. When gamma rays, such as cobalt 60 and cesium 137 are used as radiation sources, the range of 0.3–0.5 m./m. lead equivalent is preferred.

The adhesive layer 2 is a layer for bonding the metal material foil 3 to the fluorescent material layer 1, and is composed of an organic high polymer such as synthetic rubber, for example, neoprene, nitrile rubber, etc., polyvinyl butyral, alkyd resin and the like. The thickness of the adhesive layer 2 is preferably as thin as possible and below $30\mu$, since the property of the image of radiography photographed is lowered by the formed intensifying screen as the thickness of the layer is increased. As the reason why the image quality is deteriorated along with the increase of the thickness, it is thought that as the distance between metal foil 3 and fluorescent material layer 1 increase linearly the scattered radiation generated from the metal foil 3 to lead it to the fluorescent material layer increases geometrically and that the adhesive layer itself generates a scattered radiation, which causes the fluorescent material layer to emit light.

The adhesiver layer 4 in FIG. 1 and FIG. 2 is an adhesive layer for bonding the supporting layer 5 to the metal foil 3. The material is identical to that of the adhesive layer 2, but the thickness need not necessarily be as limited as for the adhesive layer 2. As described hereinbefore, the intensifying screen according to the present invention is used in radiography by means of X-rays of high energy above 100 k.v.p. or by gamma rays, to eliminate scattered radiation and to obtain a radiograph of high contrast and good quality. The present invention is illustrated by the following examples to prepare the said intensifying screen and to use the same, but it is not limited thereto.

Example 1

The following slurry, which is previously milled, is coated on a chromium-plated plate supported horizontally and a fluorescent material layer of 0.08 m./m. in dry thickness is prepared.

|  | G. |
|---|---|
| Calcium tungstate fluorescent substance | 300 |
| Cellulose nitrate | 36 |
| Dibutyl phthalate | 11 |
| Butyl acetate | 450 |
| Silicone oil | 0.01 |

On the other hand, a solution of neoprene in toluene is spray-coated on both surfaces of a 0.03 m./m. lead foil containing 6% of antimony, and adhesive layers of 0.005 m./m. thickness, after drying, are formed. The thus obtained layer is put on said fluorescent material layer, and a pper of 0.2 m./m. in thickness is then put thereon and pressed by a laminating press, after which the resulting screen is stripped from the chromium-plated plate.

Example 2

A solution of cellulose acetate in acetone is coated on a chromium-plated plate to form a film of 0.01 m./m. in thickness when dried. A fluorescent material layer of 0.16 m./m. in thickness after drying is formed on the film as described in Example 1. A solution of polyvinyl butyral in butyl acetate is coated on a pure lead foil of 0.5 m./m. in thickness in such manner that the thickness on drying is 15μ and the same treatment as Example 1 is performed to prepare a desired screen.

Example 3

Four screens are prepared varying the thickness of neoprene layer, which is the adhesive material layer in Example 1, to 4, 8, 17 and 32μ. Each film (e.g., Sakura RR) for X-rays is held between paired screens of respective kinds. A lead edge is photographed at a tube voltage of 150 k.v.p. and the unsharpness curve is obtained by a microphotometer tracing to compare the unsharpness areas. From the results, there was not found any difference at 4μ and 8μ, while the unsharpness area was increased by 4% at 17μ and by 13% at 32μ.

Example 4

Eight screens, i.e. a fluorescent screen free from metal foil and screens containing lead foil which contains 5% tin, of 0.01, 0.03, 0.05, 0.1, 0.3, 0.5 and 0.7 m./m. thickness, are prepared in the same manner as described in Example 2. Paired screens of respective kinds are used in combination with a film for X-ray (e.g., Fuji No. 400). When a steel plate of 40 m./m. thickness is photographed under the conditions of 250 k.v.p. tube voltage, 4 ma. tube current and 60 cm. distance, there is no difference of relative speed between a screen free from metal foil and screens containing a lead foil below 0.05 m./m. If the relative speed of both the above is 100, that of screens containing lead foil of 0.1, 0.3, 0.5 and 0.7 m./m. thickness are 95, 69, 47 and 35%, respectively. The fog by scattered radiation in the above case is calculated as the difference of photographic density from the unsharpness of a lead slit image, and it is decreased along with increasing the thickness of the lead foil as follows: 0.62, 0.58, 0.53, 0.46, 0.31, 0.11, 0.04 and 0.02.

On summarizing, the speed and the eliminating effect for scattered radiation from the foregoing description, it is seen that the thickness of lead foil is effective within the range of 0.01–0.5 m./m.

Example 5

In medicay X-ray photography, various kinds of grids are used selectively for desired applications in order to eliminate the scattered radiation and to obtain a photograph of good quality. It is difficult, however, to eliminate the scattered radiation from the object completely even by using a crossed grid, the grid ratio of which is above 12:1, when photographing at high voltages above 200 k.v.p., and the increase of exposure dose by using such a high grid ratio introduces problems in terms of the patients' exposure doses. Furthermore, the scattered radiation from the grid and its moving apparatus can not be disregarded above 200 k.v.p., and the fluorescent material of the intensifying screen emits light even by scattered radiation to degrade the contrast of the photograph.

By using an intensifying screen containing a lead foil of 0.01–0.03 m./m. lead equivalent according to the present invention, an X-ray photograph, having excellent contrast compared with previous fluorescent intensifying screens, can be obtained under the same photographic conditions as when using the previous fluorescent intensifying screen. The photographic conditions are described as follows:

Object: Breast (from the front to the back).
Apparatus: Toshiba EX–300 Type (manufactured by Tokyo Shibaura Electric Co., Ltd., Japan).
Tube voltage: 200 kvp. (filter, Cu 1.5 m./m.).
Tube current: 1 ma.
Distance: 400 cm.
Film: Sakura Y (manufactured by Konishiroku Photo. Ind. Co., Ltd., Japan).
Exposure time: 1.7 sec.

In the known method for eliminating scattered radiation using a fluorescent intensifying screen and a crossed grid of high grid ratio, from four to five times the exposure dose is required.

Example 6

Recently, gamma ray radiography has been utilized as a new system of radiography for diagnosis. The gamma ray radiography using "cobalt 60" eliminates the hindering shadow to reveal the infected part, which can not be found by X-ray photography, and is used for the determination of gamma ray treatment position. Since a combination of a previous intensifying screen and X-ray film for medical use does not give a good image of high contrast in this case because of scattered radiation, a fluorescent intensifying screen is often used in combination with an industrial X-ray film of fine grain (e.g., Kodak AA, Sakura RR, etc.); in this case, the fluorescent substance emits light by scattered radiation from the object and degradation of the photographic contrast can not be avoided. For this purpose, a lead foil intensifying screen may be used but it is unsatisfactory as regards the patients' exposure dose.

By using a lead foil of 0.3–0.5 lead equivalent in the intensifying screen according to the present invention, a photograph of good contrast can be obtained which is not fogged by scattered radiation. The photographing conditions are as follows:

Source: Cobalt 60 (400 C.).
Distance: 125 cm.
Film: Industrial Fine Grain Type (e.g. Kodak AA, Sakura RR).
Exposure time:
  Breast, from front to back, 1.8–2.0 sec.
  Breast, crossways, 3.5–4.0 sec.
  Head, from front to back, 4–6 sec.
  Head, crossways, 3–4 sec.

A photograph of substantially similar quality can be obtained when an intensifying screen of 0.1 m./m. lead foil is used for photographing, but three to five times the exposure time is required.

Example 7

When X-ray transmission photography is effected in non-destructive testing of welded parts of ship-building structures, high pressure vessels, etc., a fluorescent intensifying screen has been used which has high speed but is subject to the effect of scattered radiation. A lead foil intensifying screen operates to eliminate the effect of scattered radiation but substantially lowers the speed. The intensifying screen according to the present invention is most suitable for testing the welded parts because it eliminates the scattered radiation without lowering the speed. In fact, when a steel sample from 30 m./m. to 40 m./m., is photographed using an apparatus of below 260 KVP, a high quality photograph is obtained with little exposure dose compared with a lead foil intensifying screen, if an intensifying screen comprising a lead foil of 0.03–0.1 m./m. lead equivalent is used. In comparison with a fluorescent intensifying screen, the contrast is better, the defect discernibility is improved and photographing can be performed under almost the same conditions. By using the intensifying screen according to the present invention, the testing efficiency is improved and the cost of testing is reduced without lowering the defect discernibility. The health hazards of X-ray exposure for the operator are also minimized. The photographing conditions according to the present invention are shown as follows, in contrast with the known lead foil intensifying screen and fluorescent screen.

X-ray apparatus: Muller Macrotank H.
Test sample: 20 m./m. steel.
Tube current: 4 ma.
Distance: 80 cm.

| Film | Intensifying screen | Tube Voltages—Exposure | | |
|---|---|---|---|---|
| | | 1 min. | 3 min. | 10 min. |
| Fine Grain (A or R) | Pb 0.03 m./m. (above) | 250 kvp. | 227 kvp. | 177 kvp. |
| Do | Screen according to this invention | 225 kvp. | 186 kvp. | 152 kvp. |
| Fine Grain (RR or AA) | Pb 0.03 m./m. | 235 kvp. | 187 kvp. | 155 kvp. |
| Do | Screen according to this invention | 205 kvp. | 168 kvp. | 142 kvp. |
| Screen Type (F or S) | Fluorescent intensifying screen (Kyokko KZ [1]). | 120 kvp. | 110 kvp. | 102 kvp. |
| Do | Screen according to this invention | 131 kvp. | 129 kvp. | 109 kvp. |

[1] Kyokko KZ is an intensifying screen manufactured by Dainihon Toryo Co., Ltd., Japan.
NOTE.—A, AA and F film are Kodak and R, RR and S are Sakura.

Example 8

For steel sample of 50–100 m./m. in thickness as in Example 7, an intensifying screen containing lead foil of 0.1–0.3 m./m. lead equivalent according to the present invention is suitable to obtain acceptable X-ray photographs. In this case, the photographing conditions are shown as follows in comparison with a known lead foil intensifying screen and fluorescent intensifying screen.

X-ray apparatus: Siefert 400 kv.

| Test Sample | Intensifying screen | Film | Tube voltage, kvp. | Tube current, ma. | Time, min. | Distance, cm. |
|---|---|---|---|---|---|---|
| Steel 50 mm | Pb 0.03 mm | Fine Grain (RR or AA). | 350 | 8 | 1 | 80 |
| | Screen according to this invention | do | 280 | 8 | 1 | 80 |
| | Pb 0.03 mm | Medium Fine (K or N). | 280 | 8 | 1 | 80 |
| | Screen according to this invention | Screen Type (F or S) | 210 | 8 | 1 | 80 |
| Steel 100 mm | Fluorescent intensifying screen (Kyokko KZ). | do | 320 | 8 | 1 | 100 |
| | Screen according to this invention | do | 350 | 8 | 1 | 100 |

NOTE.—AA, K and F are Kodak film and RR, N and S are Sakura.

Example 9

The intensifying screen according to the present invention is especially excellent in the elimination of scattered radiation and is useful for photographing an object having large differences in thickness and affected greatly by the scattered radiation from the object, for example, castings in complicated form, pipes of small diameter, etc. For example, when a casting (cover of manhole) of 21 m./m. thickness is photographed with a screen a lead foil of 0.3–0.5 m./m. lead equivalent, an optimum photograph can be obtained under the following conditions of tube voltage: 170 k.v.p., tube current: 4 ma., distance: 60 cm., exposure time: 0.42 min., film: Sakura RR; a lead foil screen of 0.03 m./m. requires 1.0 min. exposure time and it is entirely impossible to distinguish the defect around the object by the influence of scattered radiation. Furthermore, not only for X-ray but also for gamma rays such as "cobalt 60," "cesium 137" the screen according to the invention is useful in photographing, and good results are obtained in photographing casting valves, and the like. For example, the photographing conditions for a cast steel spherical valve (pressure: 40 kg./cm.$^2$, inner diameter: 20 m./m.) with the intensifying screen according to the present invention having a lead foil of 0.3–0.5 m./m. lead equivalent, is shown as follows:

Source: Cesium 137 (2.5 C)
Distance: 100 cm.
Exposure time: 4.5 hrs.

What we claim is:

1. An intensifying screen for radiography, comprising a layer of fluorescent material, a supporting layer constituted of a material which is transparent of radiation, a metal foil interposed between said layer of fluorescent material and said supporting layer, adhesive layers securing the metal foil to the layer of fluorescent material and to the supporting layer to form an integral body, said fluorescent material being composed of a fluorescent substance of high emission efficiency to radiation, said metal foil being selected from the group consisting of lead foil of 0.01 to 0.5 mm. in thickness and a lead alloy foil equivalent thereto, for preventing scattered radiation from reaching the supporting layer.

2. An intensifying screen for radiography as claimed in claim 1, wherein the adhesive layer bonding the layer of fluorescent material to the metal foil absorbs substantially no radiation and is less than 30$\mu$ in thickness.

3. An intensifying screen for radiography as claimed in claim 1, wherein the metal foil has a thickness of 0.01–0.03 mm. lead equivalent for photography of the human body with X-rays of a voltage above 100 kvp.

4. An intensifying screen for radiography as claimed in claim 1, wherein the metal foil has a thickness of 0.03–0.1 mm. lead equivalent when a steel plate of a thickness less than 50 mm. or a material having an X-ray absorption equivalent thereof is photographed with X-rays of a voltage above 100 kvp.

5. An intensifying screen for radiography as claimed in claim 1, wherein the metal foil has a thickness of 0.1–0.3 mm. lead equivalent when a steel plate thicker than 50 mm. or a material having an X-ray absorption equivalent thereof is photographed with X-rays of a voltage above 100 kvp.

6. An intensifying screen for radiography as claimed in claim 1, wherein the metal foil has a thickness of 0.3–0.5 mm. lead equivalent when a metal product of large differences in thickness and in a complicated form is photographed with X-rays of a voltage above 100 kvp.

7. An intensifying screen for radiography as claimed in claim 1, wherein the metal foil has a thickness of 0.3–0.5 mm. lead equivalent when gamma rays are used as a radiation source.

8. An intensifying screen for radiography as claimed in claim 1, wherein said layers are coextensive with one another.

References Cited

UNITED STATES PATENTS

| | | | |
|---|---|---|---|
| 1,909,312 | 5/1933 | Page | 250—68 |
| 2,144,392 | 1/1939 | Saffir | 250—69 |
| 2,413,459 | 12/1946 | Lynch | 250—80 |
| 2,904,689 | 9/1959 | Masi et al. | 250—80 |
| 3,124,683 | 3/1964 | Larson | 250—65 X |
| 3,237,009 | 2/1966 | Warman et al. | 250—83.1 |

RALPH G. NILSON, *Primary Examiner.*

S. ELBAUM, *Assistant Examiner.*